(12) United States Patent
Eum et al.

(10) Patent No.: US 12,476,535 B2
(45) Date of Patent: Nov. 18, 2025

(54) METHOD AND SYSTEM OF REDUCING TOTAL HARMONIC DISTORTION OF POWER-FACTOR CORRECTION CONVERTERS

(71) Applicant: SEMICONDUCTOR COMPONENTS INDUSTRIES, LLC, Scottsdale, AZ (US)

(72) Inventors: Hyunchul Eum, Chandler, AZ (US); Minha Hwang, Seoul (KR); Dhruv Chopra, Gilbert, AZ (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 298 days.

(21) Appl. No.: 18/182,518

(22) Filed: Mar. 13, 2023

(65) Prior Publication Data
US 2024/0313640 A1    Sep. 19, 2024

(51) Int. Cl.
*H02M 1/42*    (2007.01)
*H02M 1/12*    (2006.01)

(52) U.S. Cl.
CPC .......... *H02M 1/4208* (2013.01); *H02M 1/12* (2013.01)

(58) Field of Classification Search
CPC .... H02M 1/42; H02M 1/4225; H02M 1/4208; H02M 1/0058
See application file for complete search history.

(56) References Cited

U.S. PATENT DOCUMENTS

| | | | |
|---|---|---|---|
| 2006/0061337 A1* | 3/2006 | Kim | G05F 1/70 323/205 |
| 2008/0002439 A1* | 1/2008 | Allinder | H02M 3/33523 363/21.01 |
| 2011/0305052 A1* | 12/2011 | Saint-Pierre | H02M 1/4225 363/89 |
| 2013/0194842 A1* | 8/2013 | Bianco | H02M 3/156 363/84 |

(Continued)

FOREIGN PATENT DOCUMENTS

DE    102007035606 A1 *   8/2008   ..........   H02M 1/4225

OTHER PUBLICATIONS

Semiconductor Components Industries, LLC, "Enhanced, High-Efficiency Power Factor Controller", NCP1623/D, Rev. 0, Dec. 2021, 20 pages. (Year: 2021).*

(Continued)

*Primary Examiner* — Gary L Laxton
*Assistant Examiner* — Jennifer C Caulk
(74) *Attorney, Agent, or Firm* — Dickinson Wright PLLC; James P. Purrington, Jr.

(57) ABSTRACT

Reducing total harmonic distortion of power-factor correction switching converters. At least one example is a method of operating a power-factor-correction (PFC) converter, the method comprising: charging an inductance of the PFC converter, thereby creating a charge mode; asserting, during the charge mode, an initial-reset signal by a reset circuit implementing voltage-mode control; ending the charge mode a compensated time after assertion of the initial-reset signal, the compensated time inversely proportional to a magnitude of an input voltage of the PFC converter; and then discharging the inductance of the PFC converter.

17 Claims, 7 Drawing Sheets

(56) References Cited

U.S. PATENT DOCUMENTS

2017/0179845 A1    6/2017  Adragna
2017/0214325 A1*   7/2017  Chang .................... H02M 1/08

OTHER PUBLICATIONS

Semiconductor Components Industries, LLC, "High Voltage GreenLine Power Factor Controller", MC33368/D, Rev. 11, Aug. 2011, 17 pages. (Year: 2011).*
Semiconductor Components Industries, LLC, "Enhanced, High-Efficiency Power Factor Controller", NCP1623/D, Rev. 0, Dec. 2021, 20 pages.

* cited by examiner

METHOD AND SYSTEM OF REDUCING TOTAL HARMONIC DISTORTION OF POWER-FACTOR CORRECTION CONVERTERS

CROSS-REFERENCE TO RELATED APPLICATIONS

Not Applicable.

BACKGROUND

In converting AC to DC for use by modern electronic equipment, DC-DC switching power converters present non-linear impedance with respect to AC mains, and thus have poor power factor. To address the issue, many systems implement a power-factor-correction converter (PFC converter), itself a switching power converter, prior to the downstream DC-DC switching power converter. While PFC converters bring the power factor of the combined system closer to unity, PFC converters may create total harmonic distortion of input current above acceptable limits.

SUMMARY

One example is a method of operating a power-factor-correction (PFC) converter, the method comprising: charging an inductance of the PFC converter, thereby creating a charge mode; asserting, during the charge mode, an initial-reset signal by a reset circuit implementing voltage-mode control; ending the charge mode a compensated time after assertion of the initial-reset signal, the compensated time inversely proportional to a magnitude of an input voltage of the PFC converter; and then discharging the inductance of the PFC converter.

In the example method, ending the charge mode may comprise: sensing a signal indicative of the magnitude of the input voltage; and setting the compensated time based on the signal indicative of the magnitude of the input voltage. Sensing the signal indicative of the magnitude of the input voltage may comprise sensing the input voltage by way of a voltage divider coupled to the input voltage. Sensing the signal indicative of the magnitude of the input voltage may comprise averaging a signal indicative of voltage at a switch node of the PFC converter. Sensing the signal indicative of the magnitude of the input voltage may comprise sensing a voltage of an auxiliary winding of a transformer, and wherein a primary winding of the transformer forms the inductance of the PFC converter.

In the example method, ending the charge mode may comprise, responsive to assertion of the initial-reset signal: charging a capacitor with a charging current having a magnitude proportional to the magnitude of the input voltage; and ending the charge mode when a voltage on the capacitor meets or exceeds a voltage reference.

In the example method, ending the charge may mode comprise: sampling a signal indicative of the magnitude of the input voltage and creating a digital voltage value; dividing a proportionality value by the digital voltage value, and thereby creating a reference value; responsive to asserting of the initial-reset signal, incrementing a counter creating a count value; and ending the charge mode when the count value reaches the reference value.

Another example is a PFC controller for a PFC converter, the PFC controller comprising: a sense terminal, a drive terminal, and a feedback terminal; a charge-mode start controller defining a start output, the charge-mode start controller configured to assert the start output to begin each charge mode of the PFC converter; a voltage-mode controller defining a feedback input coupled to the feedback terminal, and an initial-reset output, the voltage-mode controller configured to assert the initial-reset output by implementing voltage-mode control; a driver defining a drive output coupled to the drive terminal, a start input coupled to the start output, and a reset input, the driver configured to assert the drive terminal responsive to assertion of the start input, and to de-assert the drive terminal responsive to assertion of the reset input; and a reset-delay controller defining a sense input coupled to the sense terminal, an initial-reset input coupled to the initial-reset output, and a final-reset output coupled to the reset input of the driver. The reset-delay controller may be configured to: sense a signal indicative of magnitude of an input voltage of the PFC converter by way of the sense terminal, and assert the final-reset output a compensated time after assertion of the initial-reset input, the compensated time inversely proportional to the signal indicative of magnitude of the input voltage.

In the example PFC controller, when the reset-delay controller senses the signal indicative of magnitude of the input voltage, the reset-delay controller may be further configured to sense the input voltage directly from the sense terminal.

In the example PFC controller, when the reset-delay controller senses the signal indicative of magnitude of the input voltage, the reset-delay controller may be further configured to average a signal indicative of voltage at a switch node of the PFC converter, the signal indicative of voltage at the switch node applied to the sense terminal.

In the example PFC controller, when the reset-delay controller senses the signal indicative of magnitude of the input voltage, the reset-delay controller may be configured to sense a voltage of an auxiliary winding of a transformer coupled to the sense terminal.

In the example PFC controller, when the reset-delay controller asserts the final-reset output, the reset-delay controller may be configured to, responsive to assertion of the initial-reset input: charge a capacitor with a charging current having a magnitude proportional to the signal indicative of magnitude of the input voltage; and assert the final-reset output when a voltage on the capacitor meets or exceeds a reference voltage.

In the example PFC controller, when the reset-delay controller asserts the final-reset output, the reset-delay controller may be configured to: sample the signal indicative of magnitude of the input voltage and create a digital voltage value; divide a proportionality value by the digital voltage value, and thereby create a reference value; responsive to assertion of the initial-reset input, begin incrementing a counter creating a count value; and assert the final-reset output when the count value reaches the reference value.

Yet another example is a PFC converter comprising: an inductor with a first lead coupled to a voltage input and a second lead defining a switch node; a rectifier with a first lead coupled to the switch node, and a second lead defining a voltage output of the PFC converter; an electrically-controlled switch with a first lead coupled to the switch node, a second lead coupled to a reference voltage, and a control input; and a PFC controller. The PFC controller may comprise: a charge-mode start controller defining a sense input coupled to a signal indicative of a voltage at the switch node, and a start output, the charge-mode start controller configured to assert the start output in a predetermined valley of the voltage at the switch node; a voltage-mode controller defining a feedback input coupled to the voltage output, and an initial-reset output, the voltage-mode controller configured to assert the initial-reset output by implementing voltage-mode control; a driver defining a drive output coupled to the control input of the electrically-controlled switch, a start input coupled to the start output, and a reset input, the driver configured to assert the control input responsive to assertion of the start input, and to de-assert the control input responsive to assertion of the reset input; and a reset-delay controller defining a sense input, an initial-reset input coupled to the initial-reset output, and a final-reset output coupled to the reset input of the driver. The reset-delay controller may be configured to: sense a signal indicative of magnitude of an input voltage of the PFC converter, and assert the final-reset output an adjusted time after assertion of the initial-reset input, the adjusted time inversely proportional to the signal indicative of magnitude of the input voltage.

In the example PFC converter, when the reset-delay controller senses the signal indicative of magnitude of the input voltage, the reset-delay controller may be further configured to sense the input voltage directly at a sense terminal coupled to the voltage input.

In the example PFC converter, when the reset-delay controller senses the signal indicative of magnitude of the input voltage, the reset-delay controller may be further configured to average a signal indicative of the voltage at the switch node of the PFC converter applied to a sense terminal.

The example PFC converter may further comprise: a transformer in which the inductor is a primary winding of the transformer, and the transformer defines an auxiliary winding; wherein when the reset-delay controller senses the signal indicative of magnitude of the input voltage, the reset-delay controller is further configured to sense a voltage of the auxiliary winding.

In the example PFC converter, when the reset-delay controller asserts the final-reset output, the reset-delay controller is configured to, responsive to assertion of the initial-reset input: charge a capacitor with a charging current having a magnitude proportional to the signal indicative of magnitude of the input voltage; and assert the final-reset output when a voltage on the capacitor meets or exceeds a voltage reference.

In the example PFC converter, when the reset-delay controller asserts the final-reset output, the reset-delay controller is configured to: sample the signal indicative of magnitude of the input voltage and create a digital voltage value; divide a proportionality value by the digital voltage value, and thereby create a reference value; responsive to assertion of the initial-reset input, begin incrementing a counter creating a count value; and assert the final-reset output when the count value reaches the reference value.

In the example PFC converter, a total harmonic distortion of an input current of the PFC converter may be 5% or less.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"About" in reference to a recited parameter shall mean the recited parameter plus or minus ten percent (+/−10%) of the recited parameter.

"AC" shall mean alternating current as those terms are understood within electrical engineering.

"DC" shall mean direct current as those terms are understood within electrical engineering.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a reduced-instruction-set computing (RISC) with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various examples are directed to power-factor-correction (PFC) converters, and reducing total harmonic distortion of the input current of PFC converters. More particularly, various examples are directed to reducing total harmonic distortion of the input current caused by negative inductor currents at the point in time at which each charge mode begins, the negative inductor current used to implement soft switching of the electrically-controlled switch of the PFC converter. More particularly still, various examples implement voltage-mode control within the PFC converter, but delay ending the charge modes by an amount of time used to adjust or compensate for the negative inductor currents. Yet more particularly still, various examples delay ending each charge mode by an amount of time inversely proportional to the instantaneous magnitude of the input voltage $V_{IN}$ of the PFC converter. The discussion turns to an example system to orient the reader.

Figure 1:
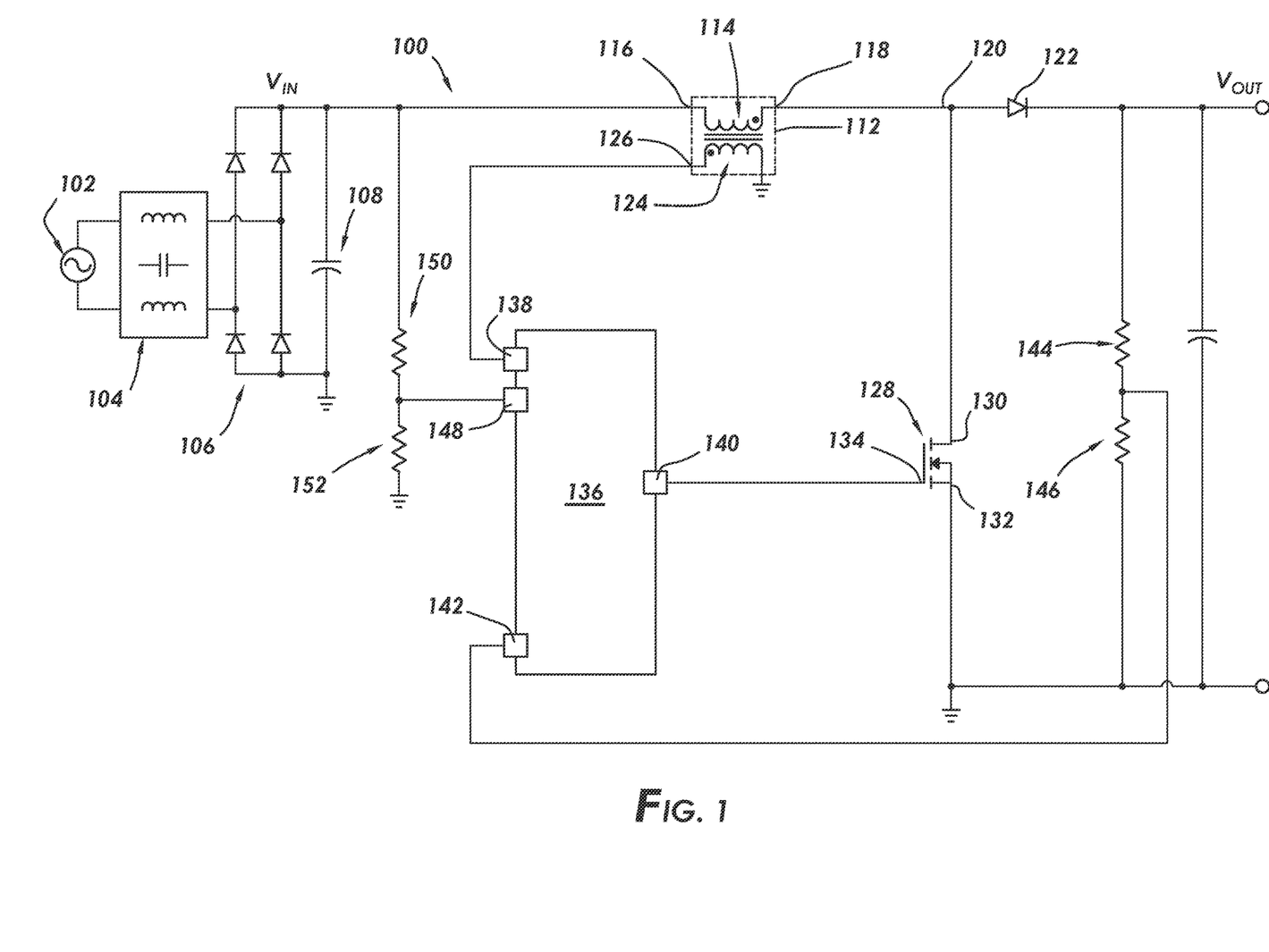
FIG. 1 shows a schematic of a system with a PFC converter, in accordance with at least some embodiments.

FIG. 1 shows a schematic of a system with a PFC converter 100. In particular, the example system comprises a source of AC power 102, such as 120 Volt AC or 240 Volt AC (50 or 60 Hz). The source of AC power 102 is coupled to an electromagnetic interference filter (EMI filter) 104 and a bridge rectifier 106. The example bridge rectifier 106 generates a full wave rectified signal applied to an input capacitor 108. Thus, the bridge rectifier 106 and the input capacitor 108 define the voltage input to which the PFC converter 100 is coupled.

The example PFC converter 100 comprises a transformer 112. The transformer 112 has a primary winding 114 with a first lead 116 coupled to the voltage input, and a second lead 118 coupled to and defining a switch node 120. The example PFC converter 100 further includes a rectifier in the example form of a diode 122 with an anode coupled to the switch node 120 and a cathode defining a DC voltage output $V_{OUT}$. In one example, the voltage output $V_{OUT}$ may be about 385V for the example input voltage $V_{IN}$ range above. The transformer 112 further includes a secondary or auxiliary winding 124 that defines a sense lead 126 and a second lead coupled to a reference voltage (e.g., ground or common). The primary winding 114 provides inductance for the boost converter. The auxiliary winding 124 may be used to detect the end of each discharge mode of the inductance provided by the primary winding 114, the detection discussed in greater detail below. In some examples, the auxiliary winding 124 may also be used to derive a signal indicative of the input voltage $V_{IN}$, also discussed more below.

The example PFC converter 100 further comprises an electrically-controlled switch 128 defining a first connection, a second connection, and control input. In many implementations, the electrically-controlled switch 128 is a transistor, such as a field effect transistor, and thus the electrically-controlled switch is hereafter referred to as FET 128. Thus, the example FET 128 defines a drain 130 coupled to the switch node 120, a source 132 coupled to the reference voltage, and a gate 134. When the gate 134 is asserted, the FET 128 becomes conductive. When the FET 128 is conductive, current flow through the primary winding 114 rises over time, storing energy in the field surrounding the primary winding 114. Because current through the inductance of the primary winding 114 cannot change instantaneously, when the gate 134 of the FET 128 is de-asserted and the FET 128 becomes non-conductive, the current continues to flow through the diode 122 to the voltage output $V_{OUT}$.

The example PFC converter 100 further comprises a PFC controller 136. The example PFC controller 136 defines a sense terminal 138 coupled to the sense lead 126 of the transformer 112. While the sense terminal 138 is shown directly coupled to the sense lead 126, in some cases the coupling may be through a resistor to limit current flow through the PFC controller 136. The PFC controller 136 further defines a drive terminal 140. The drive terminal 140 is coupled to the gate 134 of the example FET 128. While the drive terminal 140 is shown directly coupled to the gate 134, in some cases the coupling may be through a resistor to limit inrush current caused by the capacitance of the gate 134. When the PFC controller 136 asserts the drive terminal 140, thus asserting the gate 134, the example FET 128 becomes conductive. Oppositely, when the PFC controller 136 de-asserts the drive terminal 140, thus de-asserting the gate 134, the example FET 128 becomes non-conductive.

The example PFC controller 136 further defines a feedback terminal 142. In the example system, the feedback terminal 142 is coupled to the voltage output $V_{OUT}$ by way of a voltage divider made of resistors 144 and 146. Thus, the PFC controller 136 may sense a signal indicative of the voltage of the voltage output $V_{OUT}$ as part of the closed-loop control of the voltage output $V_{OUT}$. The example PFC controller 136 further defines an optional input-sense terminal 148. The example input-sense terminal 148 is coupled to the input voltage $V_{IN}$ by way of a voltage divider made of resistors 150 and 152.

Additional terminals for the PFC controller 136 will be present. For example, additional terminals will be present for the voltage supply and for the common or ground connection. Additional terminals may be present for various design-specific settings, such as a terminal for setting the maximum on-time for each charge mode and a terminal for setting soft-start timing. However, the various additional terminals and connections are not shown so as not to unduly complicate the figure. The specification now turns to example waveforms to orient the reader to several operational concepts and terminology.

Figure 2A:
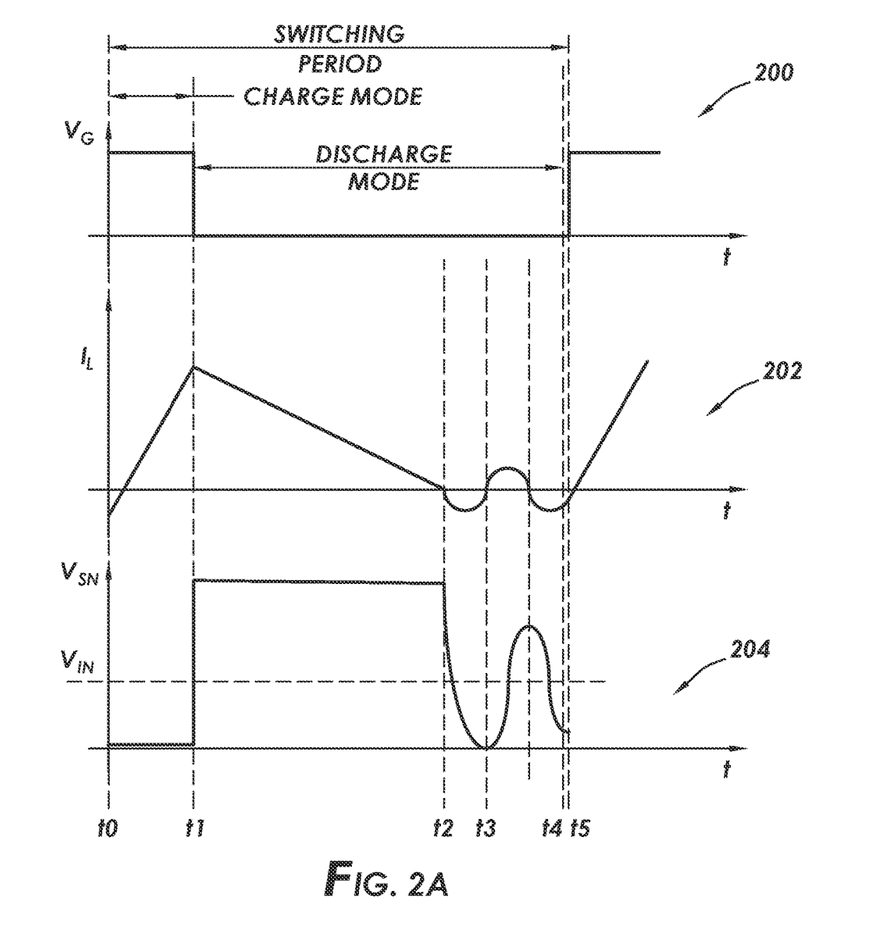
FIG. 2A shows a series of waveforms associated with a boost converter, in accordance with at least some embodiments.

FIG. 2A shows a series of waveforms associated with a boost converter. In particular, the upper waveform shows an example drive signal 200 that may be driven to the gate 134 of the FET 128. The middle waveform shows inductor current 202 through the primary winding 114 of the transformer 112. The lower waveform shows voltage at the switch node 120, hereafter switch-node voltage 204. While the waveforms show different parameters, the waveforms are plotted along corresponding time axes.

Referring initially to the drive signal 200. The example drive signal 200 is shown to become asserted at time t0, and remain asserted until time t1. In this example, the drive signal 200 is asserted high or with a high voltage, but the asserted state may be arbitrarily selected at the discretion of the circuit designer. When the drive signal 200 is asserted, the example FET 128 is conductive and thus the current through the primary winding 114 is rising, as shown by the inductor current 202. It follows that, during the same period of time, the switch-node voltage 204 is effectively zero, neglecting the small voltage drop across the FET 128. The period of time between t0 and t1 is referred to as a charge mode, because the current through the primary winding 114 is ramping upward and storing energy in the field surrounding the primary winding 114.

The example drive signal 200 is shown to become de-asserted at time t1, and remain de-asserted until the next charge mode. When the drive signal 200 is de-asserted, the example FET 128 is non-conductive and thus the current through the primary winding 114 falls from the peak current as shown by the inductor current 202, but also the current provided by the primary winding 114 flows through the diode 122 to the voltage output $V_{OUT}$. During the same period of time, the switch-node voltage 204 is relatively constant, but then drops when the inductor current 202 reaches zero at time t2.

Still referring to FIG. 2A, and specifically the inductor current 202 waveform. Though the inductor current 202 ramps downward to zero, after the current reaches zero the inductance of the primary winding 114 resonates with the parasitic capacitances of the system, mainly the capacitance of the example FET 128. Thus, after time t2 the inductor current 202 oscillates as shown in FIG. 2A. The magnitude of the oscillation compared to the magnitude of the peak current during the charge mode is not necessarily to scale in FIG. 2A, and in fact is exaggerated for clarity.

The oscillations of the inductor current 202 create a corresponding voltage at the switch node 120, as shown by the switch-node voltage 204. The magnitude of the oscillations of the switch-node voltage 204 compared to the peak magnitude of the voltage is not necessarily to scale, and in fact is exaggerated for clarity. The oscillations create peaks and valleys of the switch-node voltage 204, such as the first valley at time t3 and the second valley at time t5. While the switch-node voltage 204 waveform shows the voltage to reach zero in the first valley at time t3, such is not necessarily the case. Moreover, the oscillations ring down, and thus the valley voltages exponentially approach the magnitude of the input input $V_{IN}$ over time.

In accordance with various examples, the PFC controller 136 attempts to begin the next charge mode in a valley of the switch-node voltage 204. The valley selected is dependent upon the loading of the PFC converter 100. For example, for a PFC converter 100 providing high load, the next charge mode may begin contemporaneously with reaching the first valley at time t3. If the PFC converter 100 is providing a light load, the next charge mode may begin after two or more valleys, such as the second through a fifth valley or more. Switching a FET in the valley is "soft switching" that reduces switching losses and increases overall PFC converter 100 efficiency.

For purposes of explanation, consider that in the example of FIG. 2A the next charge mode begins in the second valley, at time t5, though any valley may be selected depending upon the load. The period of time between t1 and the selected valley, for example the valley at time t5, may be referred to as the discharge mode, because during at least a portion of the time, energy is being provided to the voltage output $V_{OUT}$. The time duration between t0 and the selected valley, comprising both the charge mode and the discharge mode, may be referred to as a switching period. The combination of a charge mode and a discharge mode may be referred to as a switching cycle.

Detecting a voltage valley, such as at t3 or t5, is a non-trivial task. In the electrically "noisy" environment of a switching power converter, mathematically establishing that a voltage valley has occurred does not take place until well past the point in time of the actual valley. In many cases, the voltage valleys are indirectly sensed, such as sensing the inductor current makes a negative to positive transition, and trigger the charge mode a predetermined time thereafter. Thus, the next charge mode may begin with a negative inductor current, such as beginning the next charge mode at time t4 rather than t5. The difference in the switch-node voltage 204 as between times t4 and t5 is relatively small. However, the negative inductor current affects the total harmonic distortion created by the PFC converter 100.

Figure 2B:
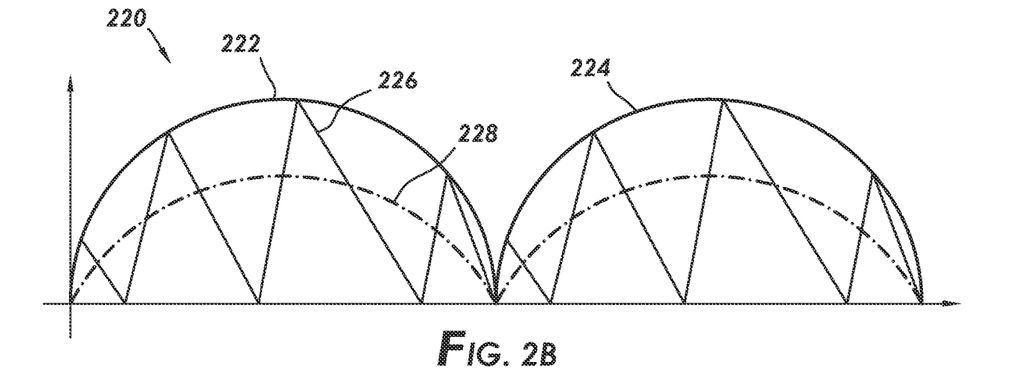
FIG. 2B co-plots an example full-wave rectified signal, and an inductor current, in a PFC converter.

FIG. 2B co-plots an example full-wave rectified voltage, the inductor current of the boost converter, and the resultant average current. In particular, visible in FIG. 2B is the full-wave rectified voltage 220, shown as a thicker solid line. If the AC mains are 60 Hz, then the full-wave rectified voltage 220 has frequency of 120 Hz. Stated otherwise, the full-wave rectified voltage 220 results in first half-line cycle 222 and a second half-line cycle 224. Co-plotted within the full-wave rectified voltage 220 is an inductor current 226 from the boost converter. In practice, the switching frequency of the boost converter may be between about 16 kilo-Hertz (kHz) and about 500 kHz, and thus the relative frequency as between the full-wave rectified voltage 220 and the inductor current 226 are not to scale. However, the simplification does illustrate how the peak current for each charge mode may be directly proportional to the instantaneous value of the full-wave rectified voltage 220. The average current 228, shown as a dash-dot-dash line, is substantially sinusoidal, and thus the power factor of the PFC converter is very close to unity.

Returning to FIG. 2A, the negative inductor currents, such as the current at time t4, causes increased total harmonic distortion when the PFC controller 136 implements voltage-mode control. That is, PFC controllers implementing voltage-mode control end each charge mode when a ramp signal crosses an error signal, the error signal indicative of the difference or the error of the output voltage $V_{OUT}$ compared to a setpoint. Voltage-mode control is discussed in greater detail below, but for now consider that the duration of each charge mode is proportional to the error signal. If the error signal indicates the output voltage $V_{OUT}$ is below the setpoint, the duration of the next charge mode is increased. If the error signal indicates the output voltage $V_{OUT}$ is above the setpoint, the duration of the next charge mode is decreased.

Figure 3:
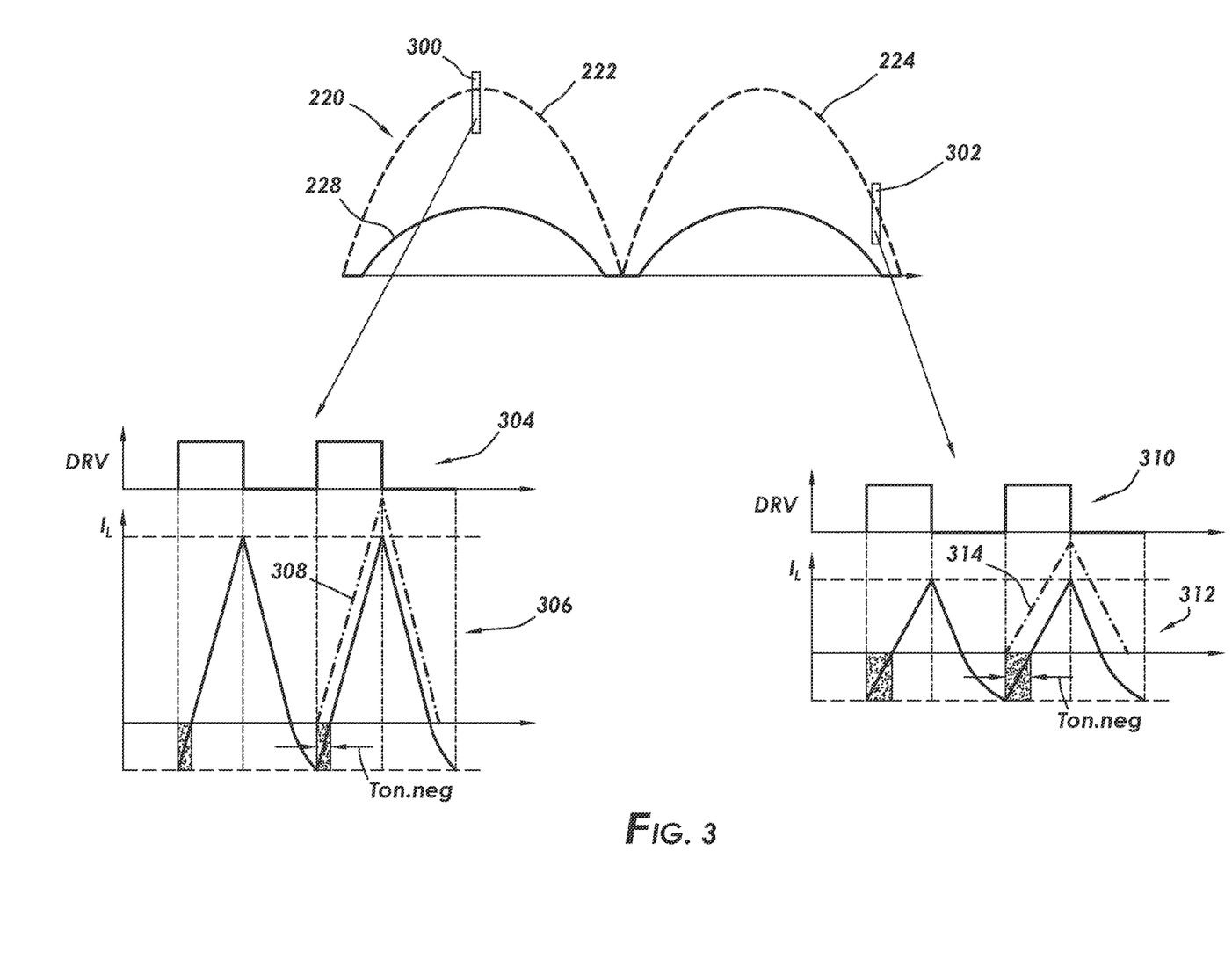
FIG. 3 shows a plot of the full-wave rectified voltage, the average current waveform, and two timing diagrams at different points in time of the half-line cycles.

FIG. 3 shows a plot of the full-wave rectified voltage, the average current waveform, and two timing diagrams at different points in time of the half-line cycles. FIG. 3 is presented to illustrate potential shortcomings in voltage-mode control in the presence of negative inductor currents. In particular, FIG. 3 shows the full-wave rectified voltage 220, and an example average current 228. Within the first half-line cycle 222, a period of time is selected near the peak, the period of time shown by rectangle 300. Within the second half-line cycle 224, another period of time is selected closer to the lowest voltage of the half-line cycle 224, the period of time shown by the rectangle 302. The periods of time are selected in different half-line cycles only for convenience of the drawings—the corresponding points as between half-line cycles have similar issues.

The bottom-left timing diagram of FIG. 3 shows an example gate drive signal 304 applied to the gate 134 of the FET 128 and an inductor current 306, both during example switching cycles within the selected period of time shown by rectangle 300. Each charge mode begins with the inductor current being negative. In the example of FIG. 3, as indicated by the inductor current 306 waveform, each charge mode begins in the first voltage valley of the switch node 120, though the switch node voltage is not shown. However, the discussion is applicable to any selected valley. When the voltage of the example half-line cycle 222 is high, the current through the inductor takes a finite amount of time to change polarity, the finite amount of time designated in the figure as Ton.neg. Stated differently, because of the initial negative current, it takes a finite amount of time for the inductor current to cross the zero point and thus begin to charge the inductance of the boost converter.

The lower-left timing diagram also illustrates a hypothetical inductor current 308, shown as a dashed-dot-dash line, that would have occurred if the inductor current at the beginning of the charge mode was zero, and the charge mode had the same duration. Notice how the peak current reached by the hypothetical inductor current 308 is higher than the inductor current 306.

Because voltage-mode control is a time-based control, the negative inductor currents affect the peak current reached in each charge mode. If unaccounted for, the negative inductor current increases total harmonic distortion, particularly as the peak currents in each charge mode get smaller near the zero points of the half-line cycles. Current-mode control, which ends each charge mode when a predetermined peak current is reached, does suffer as much from issues associated with the negative currents at the beginning of each charge mode; however, current-mode control has poor output voltage regulation, particularly in light load situations.

The bottom-right timing diagram of FIG. 3 shows the gate drive signal 310 applied to the gate 134 of the FET 128 and an inductor current 312, both during the example switching cycles within the selected period of time shown by rectangle 302. Again, each charge mode begins with the inductor current being negative to implement soft switching of the FET 128. Again in the example of FIG. 3, the charge mode begins in the first valley of the switch node 120 voltage, but the discussion is applicable to any selected valley for beginning the next charge mode. When the voltage of the example half-line cycle 224 is low, the current through the inductor takes a finite amount of time to change polarity, the finite amount of time designated in the lower-right timing diagram again as Ton.neg. Stated differently, because of the initial negative current and the lower input voltage $V_{IN}$, it takes more time for the inductor current to cross the zero point and thus begin to charge the inductance of the boost converter.

The lower-right timing diagram also illustrates a hypothetical inductor current 314, shown as a dashed-dot-dash line, that would have occurred if the inductor current at the beginning of the charge mode was zero, and the charge mode had the same duration. Notice again how the peak current reached by the hypothetical inductor current 314 is higher than inductor current 312. The negative inductor currents at the beginning of each charge result in increased total harmonic distortion on the input current to the PFC converter 100. In particular, referring to the average current 228 waveform co-plotted with the full-wave rectified voltage 220, the "flat" spots near the zero-voltage points between the half-line cycles are a result of the negative inductor currents and the corresponding lower peak currents reached in each switching cycle. The "flat" spots thus represent increased total harmonic distortion of the average current 228, even though the power factor may still approach unity.

Considering both the lower-left timing diagram and the lower-right timing diagram. The peak negative current can be considered to be the same as between the two cases. However, the amount of time it takes for the inductor current to reach zero is shorter for the higher voltage of the half-line cycle, and longer for the lower voltage of the half-line cycle. Stated differently, the Ton.neg when the input voltage $V_{IN}$ to the PFC converter 100 is high is shorter than the Ton.neg when the input voltage $V_{IN}$ to the PFC converter 100 is low. Stated in terms of peak current, in order to have the inductor current reach a peak current value illustrated by hypothetical inductor current 308 or the hypothetical inductor current 314, the duration of the charge mode should be increased by an amount inversely proportional to the magnitude of the input voltage $V_{IN}$, as shown by the full-wave rectified voltage 220. It turns out that, mathematically, in order to have the inductor current reach a peak current value illustrated by the hypothetical inductor current 308 or the hypothetical inductor current 314, the duration of the charge mode should be increased by about twice the duration of instantaneous value of Ton.neg.

In accordance with various examples, switching cycles of the inductance of the boost converter creating charge modes are adjusted or compensated for the Ton.neg. In particular, during each charge mode, an initial-reset signal is asserted by a reset circuit in the form of a voltage-mode controller. However, rather than immediately end the charge mode based on assertion of the initial-reset signal, the charge mode is ended an adjusted or compensated time after the assertion of the initial-reset signal, where the compensated time is inversely proportional to the magnitude of the input voltage $V_{IN}$ of the PFC converter 100. Thus, the peak current reached in each charge mode is closer to or matches the peak the current that would have been achieved but for the charge mode beginning with a negative inductor current. In this way, the total harmonic distortion is reduced, in some cases reduced to below 5%.

Figure 4:
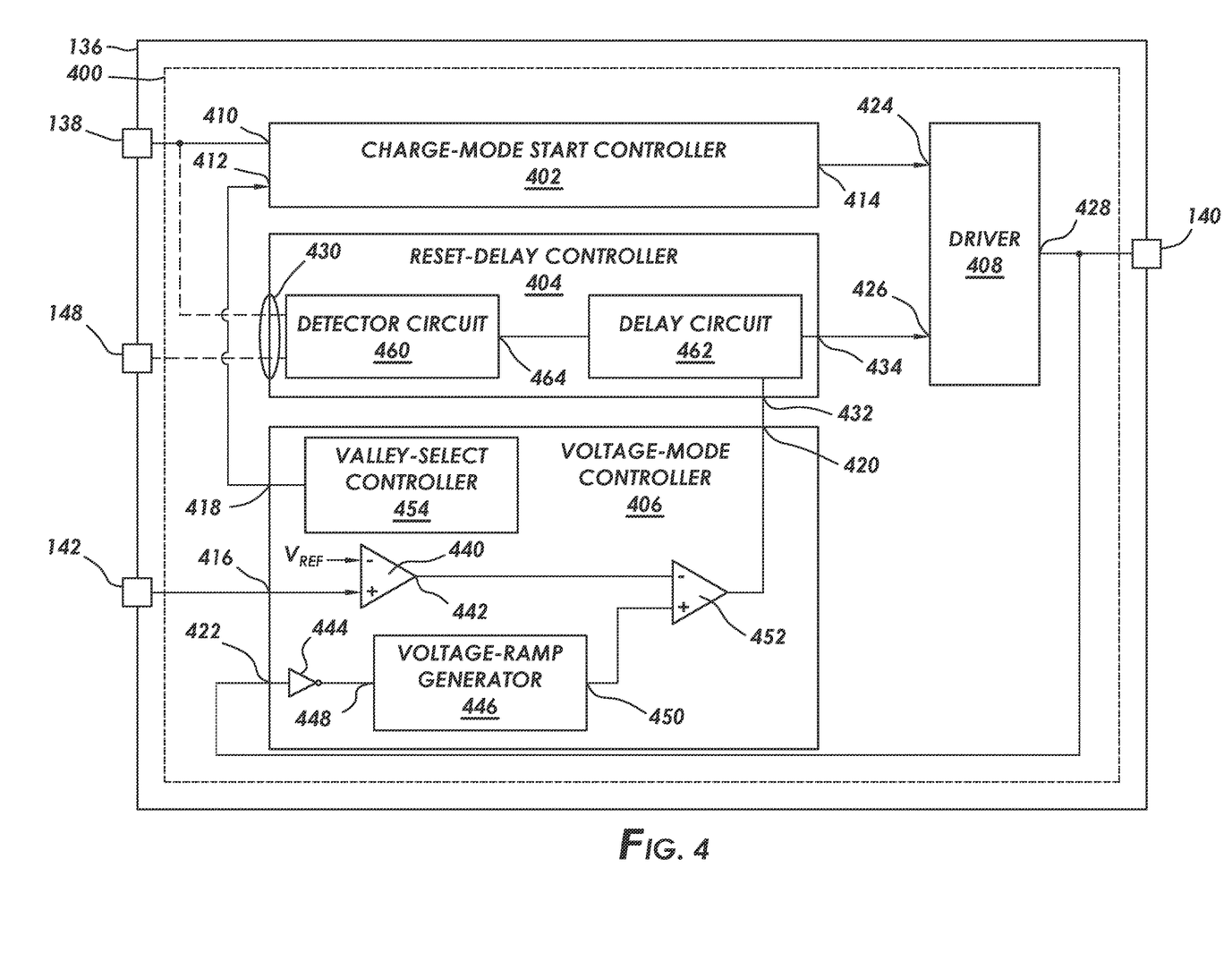
FIG. 4 shows a block diagram of a PFC controller in accordance with at least some embodiments.

FIG. 4 shows a block diagram of the example PFC controller 136. In particular, the PFC controller 136 may comprise electrical devices and circuits monolithically created on a substrate 400 and encapsulated within packaging; however, the functionality of the various components may be embodied on multiple substrates that are co-packaged (e.g., multi-chip module) and coupled to each other and the various terminals. The example PFC controller 136 defines the sense terminal 138, the drive terminal 140, the feedback terminal 142, and the optional input-sense terminal 148. Again, additional terminals will be present but are not shown so as not to unduly complicate the figure.

Internally, the example PFC controller 136 defines a charge-mode start controller 402, a reset-delay controller 404, voltage-mode controller 406, and a driver 408. The example charge-mode start controller 402 defines a sense input 410 coupled to the sense terminal 138, a valley-select input 412, and a start output 414. The example charge-mode start controller 402 is designed and constructed to assert the start output 414 to begin each charge mode of the PFC converter 100. More particularly, the charge-mode start controller 402 receives a selected-valley indication by way of the valley-select input 412. The charge-mode start controller 402 detects the end of each discharge mode by way of the sense input 410, and then detects the oscillations of the voltage at the switch node 120. In the valley indicated by the selected-valley indication, the change-mode start controller 402 asserts the start output 414.

The example PFC controller 136 further includes the voltage-mode controller 406. The example voltage-mode controller 406 defines a feedback input 416 coupled to the feedback terminal 142, a valley-select output 418 coupled to the valley-select input 412, an initial-reset output 420, and a drive input 422 coupled to the drive terminal 140. The example voltage-mode controller 406 is designed and constructed to assert the initial-reset output 420 by implementing voltage-mode control based on the feedback signal received by way of the feedback terminal 142. The voltage-mode controller 406 may be designed and constructed to drive the valley-select signal to the valley-select output 418 based on the loading conditions of the PFC converter 100. The voltage-mode control is discussed more below.

Still referring to FIG. 4, the example PFC controller 136 further includes the driver 408. The driver 408 defines a start input 424 coupled to the start output 414, a reset input 426, and a drive output 428 coupled to the drive terminal 140. The driver 408 is designed and constructed to assert the drive terminal 140 responsive to assertion of the start input 424, and to de-assert the drive terminal 140 responsive to assertion of the reset input 426.

The example PFC controller 136 further includes the reset-delay controller 404. The reset-delay controller 404 may alternatively be referred to as a compensated circuit, and the terms may be used interchangeably. The example reset-delay controller 404 defines a sense input 430, an initial-reset input 432 coupled to the initial-reset output 420, and a final-reset output 434 coupled to the reset input 426 of the driver 408. In various examples, the reset-delay controller 404 reads or senses a signal indicative of magnitude of the input voltage $V_{IN}$ of the PFC converter 100. Such a signal may be sensed directly from the optional input-sense terminal 148 coupled to the input voltage $V_{IN}$. In other cases, the signal indicative of magnitude of the input voltage $V_{IN}$ may be derived from other signals. For example, if the input-sense terminal 148 is coupled to the switch node 120 (e.g., by way of a voltage divider), the signal indicative of magnitude of the input voltage $V_{IN}$ may be calculated as the average of the voltage at the switch node 120. In other cases, the reset-delay controller 404 may derive the signal indicative of magnitude of the input voltage $V_{IN}$ by way of the sense terminal 138 coupled to the auxiliary winding 124 of the transformer 112. In particular, the voltage on the auxiliary winding is proportional to the voltage on the switch node 120, and thus the signal indicative of magnitude of the input voltage $V_{IN}$ may be calculated as the average of the voltage on the auxiliary winding 124. It follows that there are several variants of how the reset-delay controller 404 may be electrically connected, and thus the sense input 430 is shown to couple to two different terminals by way of dashed lines, but only one connection may be used depending upon the methodology of determining the signal indicative of magnitude of the input voltage $V_{IN}$. Regardless of the precise methodology for determining the signal indicative of magnitude of the input voltage $V_{IN}$, the reset-delay controller 404 is designed and constructed to assert the final-reset output 434 an adjusted or compensated time after assertion of the initial-reset input 432, the compensated time inversely proportional to the signal indicative of magnitude of the input voltage $V_{IN}$.

Still referring to FIG. 4, the discussion now turns to the voltage-mode controller 406 in greater detail. The example voltage-mode controller 406 defines a feedback amplifier 440 with a non-inverting input coupled to the feedback input 416, an inverting input coupled to a voltage reference $V_{REF}$, and an error output 442. The voltage reference $V_{REF}$ is effectively the setpoint for the voltage output $V_{OUT}$. Thus, the feedback amplifier 440 generates a signal indicative of the difference between voltage output $V_{OUT}$ and the setpoint, referred to as the voltage-error signal.

The voltage-mode controller 406 further defines a logic NOT gate 444 with an input coupled to the drive input 422 and a NOT output coupled to a voltage-ramp generator 446. The voltage-ramp generator 446 defines a reset input 448 and a ramp output 450. The voltage-ramp generator 446 is designed and constructed to drive a voltage-ramp signal to the ramp output 450, the voltage-ramp signal starting at a low value (e.g., zero or zero volts) and incrementing upward over time during each charge mode. Thus, when the drive terminal 140 is de-asserted, the reset input 448 is asserted, and the ramp signal is reset. When the drive terminal 140 is asserted, the reset input 448 is de-asserted, and voltage-ramp generator 446 produces the ramp signal having an increasing value over time.

In accordance with the various examples, the slope of the ramp signal produced by the voltage-ramp generator 446 is constant, not only within each charge mode, but is also constant across the charge modes. That is, the slope of the ramp signal does not change based on the input voltage $V_{IN}$, the output voltage $V_{OUT}$, or changes in loading of the PFC converter 100.

The example voltage-mode controller 406 further includes a comparator 452 defining a non-inverting input coupled to the ramp output 450, an inverting input coupled to the error output 442, and a compare output that defines the initial-reset output 420. In operation, during each charge mode the rising ramp signal is compared to the voltage-error signal. When the ramp signal reaches or exceeds the voltage-error signal, the comparator 452 asserts the initial-reset output 420. Thus, the voltage-mode controller 406 implements voltage-mode control, where the end of each charge mode is designated by the relationship of the ramp signal and the voltage-error signal, independent of the actual inductor current. Voltage-mode control may be contrasted against current-mode control, in which each charge mode is ended when the inductor current reaches a predetermined value based on the voltage-error signal.

Finally, the example voltage-mode controller 406 further includes a valley-select controller 454. The example valley-select controller 454 defines the valley-select output 418 coupled to the charge-mode start controller 402. The valley-select controller 454 is designed and constructed to drive a predetermined valley or valley-select signal, indicating a voltage valley within which to begin the next charge mode. In heavy load situations, the valley-select controller 454 may select the first voltage valley within which to begin the next charge mode. In lightly loaded situations, the valley-select controller 454 may select any later valley (e.g., third through eight valley) within which to begin the next charge mode. The valley-select controller 454 makes the determination using any suitable signals, such as the drive signal received on the drive input 422 and/or the voltage-error signal driven on the error output 442 of the feedback amplifier 440. However, the electrical connections are not shown so as not to unduly complicate the figure.

In related-art systems, assertion of the initial-reset output 420 ends the active charge mode. Stated otherwise, in related-art systems the initial-reset output 420 is coupled directly to the reset input 426 of the driver 408. However, as discussed above, the stand-alone voltage mode control may not adequately compensate for negative inductor currents at the beginning of each charge mode, thus increasing total harmonic distortion.

In accordance with various examples, however, the initial-reset signal driven to the initial-reset output 420 may be adjusted or compensated by way of the reset-delay controller 404. The reset-delay controller 404 may sense the signal indicative of magnitude of the input voltage $V_{IN}$ in any suitable form, and assert the final-reset output 434 an adjusted or compensated time after assertion of the initial-reset input 432. The compensated or adjusted time may be inversely proportional to the signal indicative of magnitude of the input voltage $V_{IN}$.

Still referring to FIG. 4, the example reset-delay controller 404 comprises a detector circuit 460 and a delay circuit 462. The example detector circuit 460 defines the sense input 430, in any of the example forms, and defines a signal output 464. The detector circuit 460 is designed and constructed to sense voltages and/or currents at the sense input 430, and drive the signal indicative of magnitude of the input voltage $V_{IN}$ to the signal output 464. In cases where the input voltage $V_{IN}$ is sensed directly, the detector circuit 460 may be omitted, or only contain a low pass filter. In cases where the signal indicative of magnitude of the input voltage $V_{IN}$ is derived from other voltages, like the voltage at the switch node 120 or the voltage of the auxiliary winding 124, additional circuits may be present. Example detector circuits are discussed more below.

The reset-delay controller 404 further includes the delay circuit 462. The delay circuit 462 is designed and constructed to assert the final-reset output 434 an adjusted or compensated time after assertion of the initial-reset input 432, the compensated time inversely proportional to the signal indicative of magnitude of the input voltage $V_{IN}$ received from the detector circuit 460. The specification now turns to a few example detector circuits 460, and then discuses example delay circuits 462.

Figure 5:
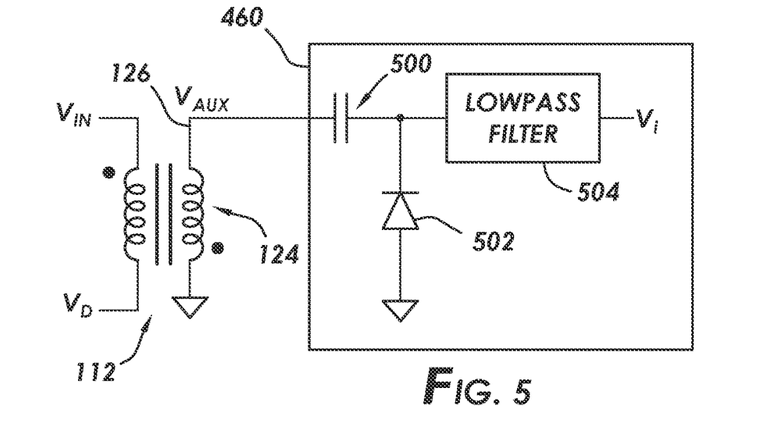
FIG. 5 shows an electrical schematic of a detector circuit in accordance with at least some embodiments.

FIG. 5 shows an electrical schematic of an example detector circuit 460. In particular, FIG. 5 shows the example transformer 112 for context, and shows the auxiliary winding 124 coupled to the detector circuit 460. The example detector circuit 460 of FIG. 5 comprises a DC blocking capacitor 500 with a first lead coupled to the sense lead 126 of the auxiliary winding and a second lead. The example detector circuit 460 further includes a diode 502 having a cathode coupled to the second lead of the capacitor 500, and an anode coupled to the reference voltage. The example detector circuit 460 further includes a low pass filter 504 coupled to the cathode of the diode 502. The DC blocking capacitor 500 blocks DC signals, but enables AC signals to pass. The diode 502 performs a half-wave rectification of the AC signals that pass the capacitor 500. The low pass filter 504 effectively performs an integration function, which produces the signal indicative of magnitude of the input voltage $V_{IN}$, the signal designated in the figure as $V_I$.

Figure 6:
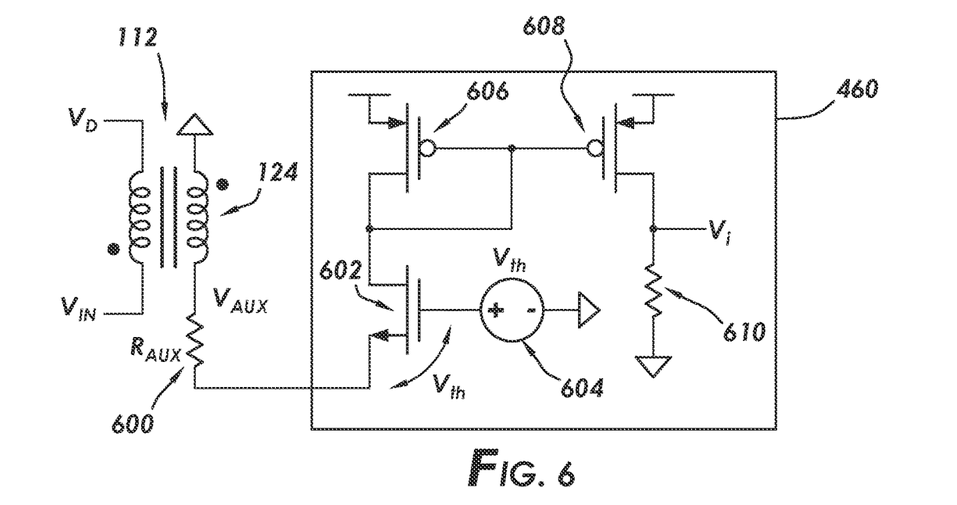
FIG. 6 shows an electrical schematic of a detector circuit in accordance with at least some embodiments.

FIG. 6 shows an electrical schematic of an example detector circuit 460. In particular, FIG. 6 shows the example transformer 112 for context, and shows the auxiliary winding 124 coupled to the detector circuit 460. The example detector circuit 460 of FIG. 6 is coupled to the auxiliary winding 124 by way of an auxiliary resistor 600. Internally, the example detector circuit 460 includes a transistor 602 arranged in an "emitter follower" arrangement, though the transistor 602 is shown as a FET rather than a junction transistor. The gate of the transistor 602 is coupled to a voltage source 604 designated Vth in the figure. Thus, the transistor 602 enables sufficient current flow through the transistor to keep the gate-to-source voltage approximately equal to the magnitude of voltage produced by the voltage source 604. Because of the polarity of the voltage induced on the auxiliary winding 124, as shown by the dot convention, current flows through the transistor 602 and auxiliary resistor 600 to the auxiliary winding 124. Effectively, the current flow through the emitter-follower arrangement is proportional to the input voltage $V_{IN}$ during charge modes. The example detector circuit 460 further includes a transistor 606 and a transistor 608 arranged as a current mirror. Thus, current through the transistor 606, as controlled by the emitter-follower arrangement, is mirrored through transistor 608, and then flows through resistor 610. In this example, the voltage developed across the resistor 610 during the charge mode is the signal indicative of magnitude of the input voltage $V_{IN}$, designated $V_I$ in the figure.

Figure 7:
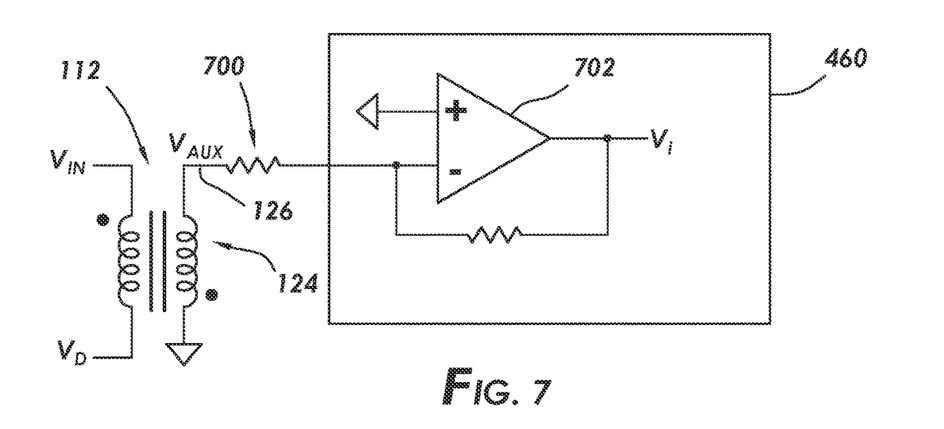
FIG. 7 shows an electrical schematic of a detector circuit in accordance with at least some embodiments.

FIG. 7 shows an electrical schematic of an example detector circuit 460. In particular, FIG. 7 shows the example transformer 112 for context, and shows the auxiliary winding 124 coupled to the detector circuit 460. The example detector circuit 460 of FIG. 7 is coupled to the auxiliary winding 124 by way of an auxiliary resistor 700. Internally, the example detector circuit 460 includes an operational amplifier 702 arranged as an inverting buffer amplifier. Because of the polarity of the voltage induced on the auxiliary winding 124, as shown by the dot convention, the voltage on the sense lead 126 is negative, but nevertheless is proportional to the input voltage $V_{IN}$ during charge modes. The operational amplifier 702, arranged as an inverter buffer, thus creates a positive polarity version of the voltage on the sense lead 126. In this example, the voltage output of the operational amplifier 702 is the signal indicative of magnitude of the input voltage $V_{IN}$, designated $V_I$ in the figure. The specification now turns to example delay circuits 462.

Figure 8:
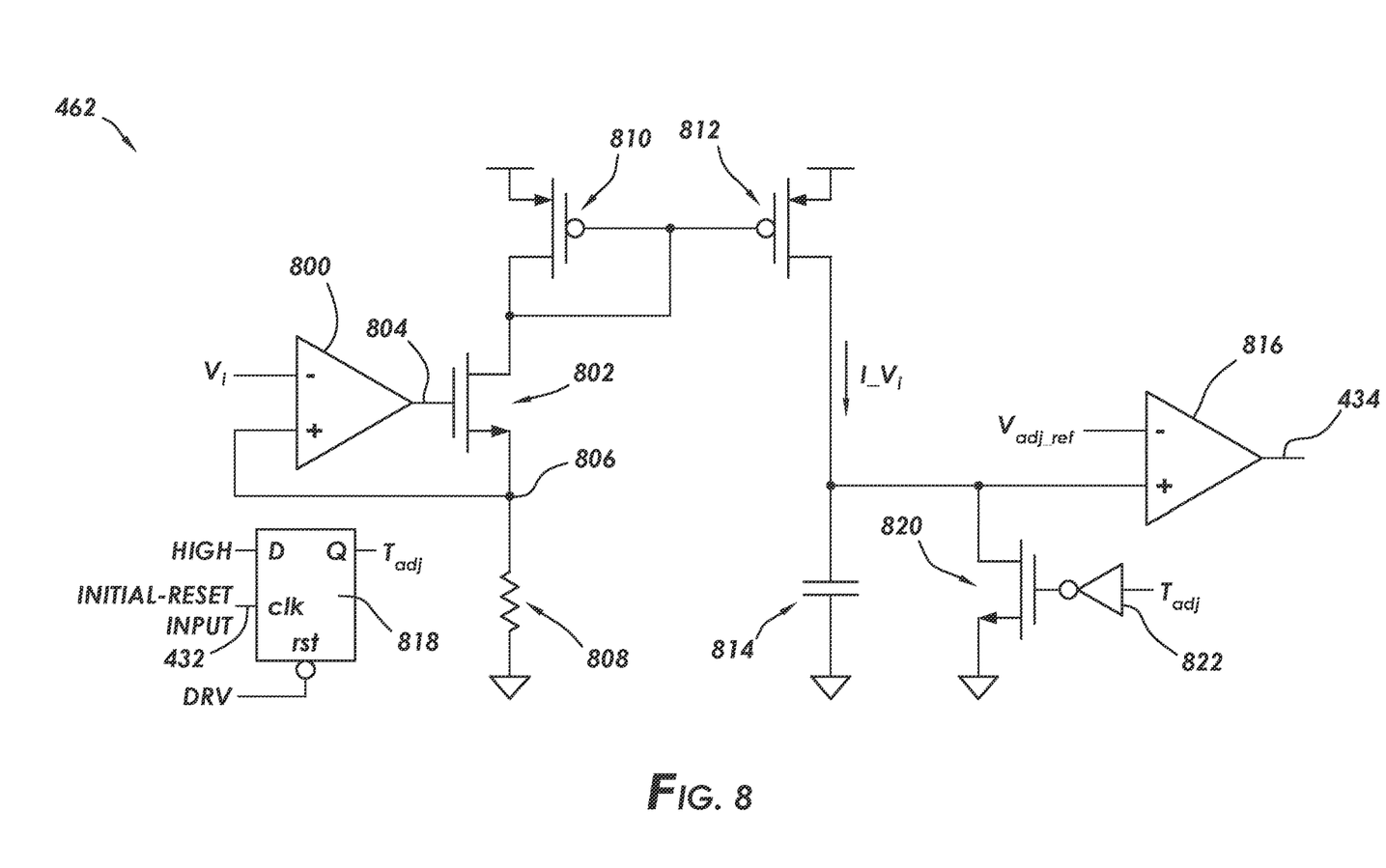
FIG. 8 shows an electrical schematic of a delay circuit in accordance with at least some embodiments.

FIG. 8 shows an electrical schematic of an example delay circuit 462. In particular, the example delay circuit 462 comprises an operational amplifier 800 defining a non-inverting input coupled to the signal indicative of magnitude of the input voltage $V_{IN}$ (Vi in the figure), an inverting input coupled to the source of a transistor 802, and an opamp output 804 coupled to the gate of the transistor 802. The combination of the operational amplifier 800 and the transistor 802 form an emitter-follower arrangement, wherein the voltage at the follower node 806 is about the same as Vi. The follower node 806 is coupled to the reference voltage by way of resistor 808, and thus the combination of the emitter-follower arrangement and resistor 808 create a current flow through the transistor 802 proportional to the magnitude of the input voltage $V_{IN}$.

The example delay circuit 462 further comprises a transistor 810 and a transistor 812 arranged as a current mirror. Thus, current through transistor 802 causes current through the transistor 810. Because of the mirror arrangement, current through the transistor 810 causes a mirror current through the transistor 812, the mirror current proportional to the input voltage $V_{IN}$, and the mirror current designated I_Vi in the figure. On the mirrored-current side, the example delay circuit 462 further includes a capacitor 814 and a comparator 816. The capacitor 814 has a first lead coupled to the transistor 812 of the current mirror and a second lead coupled to the reference voltage. The comparator 816 defines a non-inverting input coupled to the first lead of the capacitor 814, an inverting input coupled a voltage reference Vadj_ref, and a compare output that defines the final-reset output 434. In use, the mirror current I_Vi charges the capacitor 814, and when the voltage on the capacitor 814 meets or exceeds the voltage reference Vadj_ref, the final-reset output 434 is asserted.

Still referring to FIG. 8, the example delay circuit 462 further includes a latch 818 in the example form of a D latch or D flip-flop. The example latch 818 defines a D input coupled to an asserted state, illustratively shown as a high voltage. The latch defines a clock input defining the initial-reset input 432. The example latch 818 further defines a reset input coupled to a gate drive signal (e.g., coupled to the drive terminal 140). The latch 818 defines a Q output upon which is driven a time adjust signal, designated Tadj in the figure. The time adjust signal Tadj is coupled to the gate of a shorting transistor 820. In particular, the example shorting transistor 820 defines a drain coupled to the first lead of the capacitor 814, a source coupled to the reference voltage, and the gate coupled to the Q output of the latch 818 by way of a logic NOT gate 822.

In operation, during a charge mode when the drive terminal 140 is asserted, the reset input of the latch 818 is de-asserted and thus the latch holds a de-asserted state on the Q output. A de-asserted Q output thus asserts the gate of the transistor 820, shorting the capacitor 814. Once the initial-reset input 432 is asserted by the voltage-mode controller 406, the example latch 818 asserts the Q output based on the asserted state of the D input. The asserted Q output results in de-assertion of the gate of the transistor 820, and thus the mirror current I_Vi begins to charge the capacitor 814. When the voltage on the capacitor 814 meets or exceeds the voltage reference Vadj_ref, the final-reset output 434 is asserted, ending the charge mode. When the instantaneous input voltage $V_{IN}$ is high, the mirror current I_Vi charges the capacitor 814 to the voltage reference Vadj_ref quickly. Oppositely, when the instantaneous input voltage $V_{IN}$ is low, the mirror current I_Vi charges the capacitor 814 to the voltage reference Vadj_ref more slowly. It follows then, the example delay circuit 462 ends each charge mode an adjusted or compensated time after assertion of the initial-reset signal on the initial-reset input 432, the compensated time inversely proportional to the magnitude of the input voltage $V_{IN}$.

Figure 9:
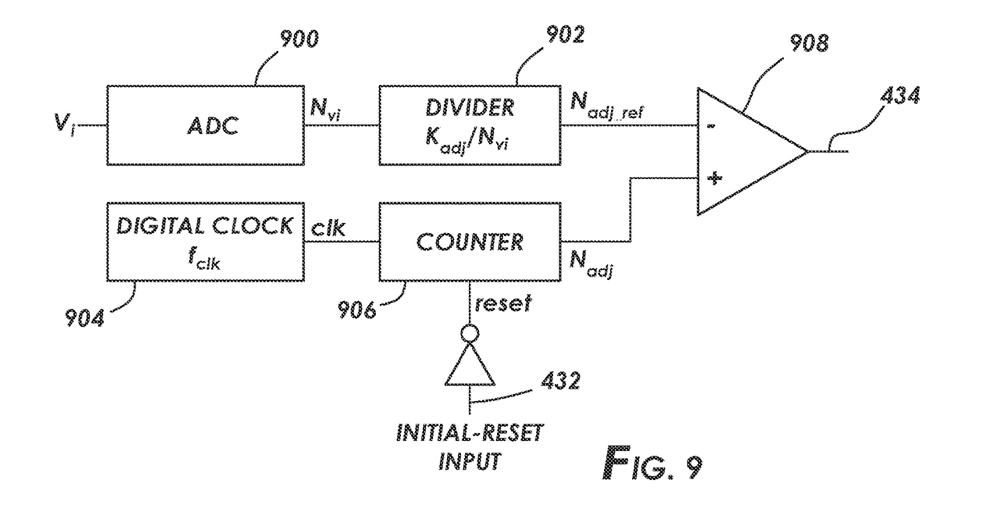
FIG. 9 shows an electrical schematic of a delay circuit in accordance with at least some embodiments.

FIG. 9 shows an electrical schematic of an example delay circuit 462. In particular, the example delay circuit 462 implements the delay digitally, rather than in an analog sense as in FIG. 8. It follows, the implementation of FIG. 9 may be executed in hardware (e.g., hardware digital counter, hardware digital divider), or in combinations of hardware and software. The example delay circuit 462 comprises an analog-to-digital (ADC) converter 900, a divider 902, a clock circuit 904, a counter 906, and a comparator 908. The ADC converter 900 is coupled to a signal indicative of magnitude of the input voltage $V_{IN}$, designated Vi in the figure, and produces a digital voltage value or conversion output Nvi in the form of a digital value. The conversion output Nvi is coupled to the divider 902. The divider 902 is designed and constructed to divide a proportionality value Kadj by the conversion output Nvi, to produce an adjusted reference value Nadj_ref in the form of a digital value.

The clock circuit 904 produces a clock signal applied to the clock input of the counter 906. The reset input of the counter 906 is coupled to the logical NOT of the initial-reset input 432. Thus, when the initial-reset input 432 is de-asserted, the reset input of the counter 906 is asserted and thus the counter resets and holds a predetermined value (e.g., zero). However, once the initial-reset input 432 is asserted by the voltage-mode controller 406, the reset input of the counter 906 is de-asserted, and thus the counter increments the count value Nadj on its count output, a digital value in this example.

The example comparator 908 is a digital comparator, and defines non-inverting input coupled to the count output Nadj, an inverting input coupled to the adjusted reference value Nadj_ref, and a compare output that defines the final-reset output 434. Thus, when the count output Nadj meets or exceeds the adjusted reference value Nadj_ref, the final-reset output 434 is asserted, ending the charge mode. When the instantaneous input voltage $V_{IN}$ is high, the adjusted reference value Nadj_ref is low, and thus the count output Nadj more quickly meets the adjusted reference value Nadj_ref. Oppositely, when the instantaneous input voltage $V_{IN}$ is low, the adjusted reference value Nadj_ref is high, and thus the count output Nadj takes more time to meet the adjusted reference value Nadj_ref. It follows then, the example delay circuit 462 of FIG. 9 ends each charge mode an adjusted or compensated time after assertion of the initial-reset signal on the initial-reset input 432, the compensated time inversely proportional to the magnitude of the input voltage $V_{IN}$.

Figure 10:
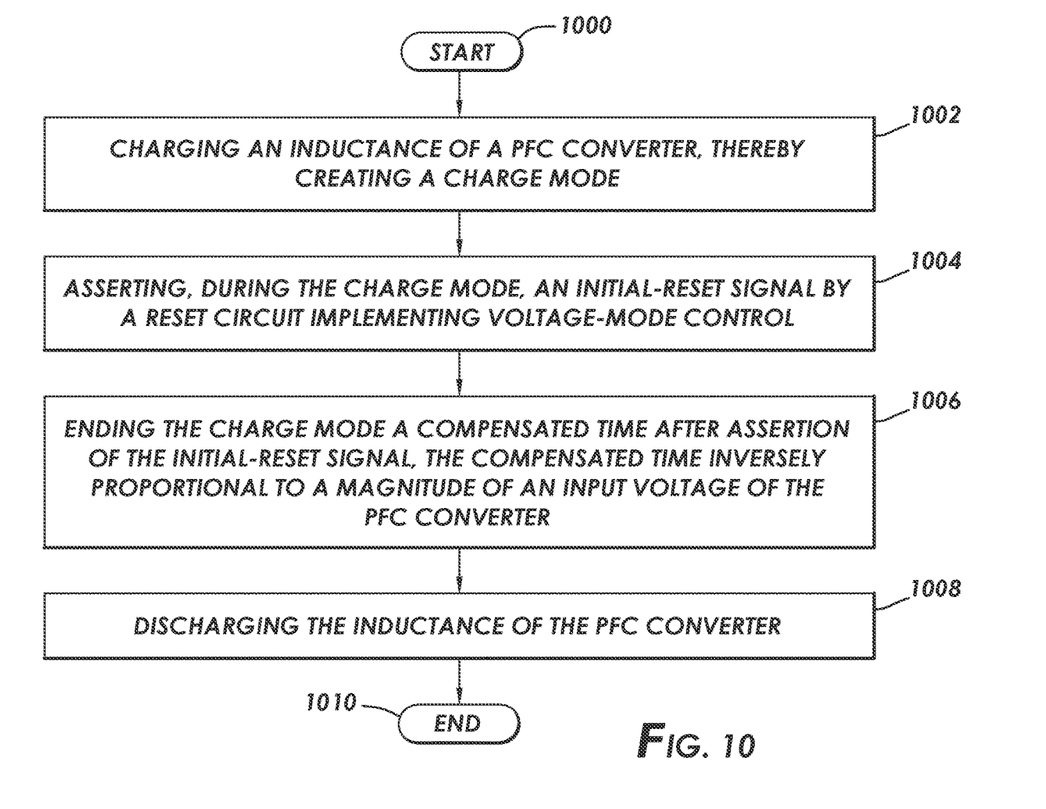
FIG. 10 shows a method in accordance with at least some embodiments.

FIG. 10 shows a method in accordance with at least some embodiments. In particular, the method starts (block 1000) and comprises: charging an inductance of a PFC converter, thereby creating a charge mode (block 1002); asserting, during the charge mode, an initial-reset signal by a reset circuit implementing voltage-mode control (block 1004); ending the charge mode a compensated time after assertion of the initial-reset signal, the compensated time inversely proportional to a magnitude of an input voltage of the PFC converter (block 1006); and then discharging the inductance of the PFC converter (block 1008). Thereafter, the method ends (block 1010), to be restarted on the next charge mode.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power-factor-correction (PFC) converter, the method comprising:
    selecting a valley of a voltage signal at a switch node of the PFC converter;
    charging an inductance of the PFC converter, thereby creating a charge mode, wherein charging is started in the selected valley of the voltage at the switch node;
    asserting, during the charge mode, an initial-reset signal by a reset circuit implementing voltage-mode control;
    ending the charge mode a compensated time after assertion of the initial-reset signal, the compensated time inversely proportional to a magnitude of an input voltage of the PFC converter; and then
    discharging the inductance of the PFC converter,
    wherein ending the charge mode comprises:
        sampling a signal indicative of the magnitude of the input voltage and creating a digital voltage value;
        dividing a proportionality value by the digital voltage value, and thereby creating a reference value;
        responsive to asserting of the initial-reset signal, incrementing a counter creating a count value; and
        ending the charge mode when the count value reaches the reference value.

2. The method of claim 1 wherein ending the charge mode comprises:
   sensing a signal indicative of the magnitude of the input voltage; and
   setting the compensated time based on the signal indicative of the magnitude of the input voltage.

3. The method of claim 2 wherein sensing the signal indicative of the magnitude of the input voltage comprises sensing the input voltage by way of a voltage divider coupled to the input voltage.

4. The method of claim 2 wherein sensing the signal indicative of the magnitude of the input voltage comprises averaging a signal indicative of the voltage at the switch node of the PFC converter.

5. The method of claim 2 wherein sensing the signal indicative of the magnitude of the input voltage comprises sensing a voltage of an auxiliary winding of a transformer, and wherein a primary winding of the transformer forms the inductance of the PFC converter.

6. The method of claim 1 wherein ending the charge mode comprises, responsive to assertion of the initial-reset signal:
   charging a capacitor with a charging current having a magnitude proportional to the magnitude of the input voltage; and
   ending the charge mode when a voltage on the capacitor meets or exceeds a voltage reference.

7. A power-factor-correction (PFC) controller for a PFC converter, the PFC controller comprising:
   a sense terminal, a drive terminal, and a feedback terminal;
   a charge-mode start controller defining a start output, the charge-mode start controller configured to assert the start output in a predetermined valley of a voltage at a switch node of the PFC converter;
   a voltage-mode controller defining a feedback input coupled to the feedback terminal, and an initial-reset output, the voltage-mode controller configured to assert the initial-reset output by implementing voltage-mode control;
   a driver defining a drive output coupled to the drive terminal, a start input coupled to the start output, and a reset input, the driver configured to assert the drive terminal responsive to assertion of the start input, and to de-assert the drive terminal responsive to assertion of the reset input;
   a reset-delay controller defining a sense input coupled to the sense terminal, an initial-reset input coupled to the initial-reset output, and a final-reset output coupled to the reset input of the driver, the reset-delay controller configured to:
      sense a signal indicative of magnitude of an input voltage of the PFC converter by way of the sense terminal, and
      assert the final-reset output a compensated time after assertion of the initial-reset input, the compensated time inversely proportional to the signal indicative of magnitude of the input voltage,
   wherein when the reset-delay controller asserts the final-reset output, the reset-delay controller is configured to:
      sample the signal indicative of magnitude of the input voltage and create a digital voltage value;
      divide a proportionality value by the digital voltage value, and thereby create a reference value;
      responsive to assertion of the initial-reset input, begin incrementing a counter creating a count value; and
      assert the final-reset output when the count value reaches the reference value.

8. The PFC controller of claim 7 wherein when the reset-delay controller senses the signal indicative of magnitude of the input voltage, the reset-delay controller is further configured to sense the input voltage directly from the sense terminal.

9. The PFC controller of claim 7 wherein when the reset-delay controller senses the signal indicative of magnitude of the input voltage, the reset-delay controller is further configured to average a signal indicative of the voltage at the switch node of the PFC converter, the signal indicative of voltage at the switch node applied to the sense terminal.

10. The PFC controller of claim 7 wherein when the reset-delay controller senses the signal indicative of magnitude of the input voltage, the reset-delay controller is configured to sense a voltage of an auxiliary winding of a transformer coupled to the sense terminal.

11. The PFC controller of claim 7 wherein when the reset-delay controller asserts the final-reset output, the reset-delay controller is configured to, responsive to assertion of the initial-reset input:
   charge a capacitor with a charging current having a magnitude proportional to the signal indicative of magnitude of the input voltage; and
   assert the final-reset output when a voltage on the capacitor meets or exceeds a reference voltage.

12. A power-factor-correction (PFC) converter comprising:
   an inductor with a first lead coupled to a voltage input and a second lead defining a switch node;
   a rectifier with a first lead coupled to the switch node, and a second lead defining a voltage output of the PFC converter;
   an electrically-controlled switch with a first lead coupled to the switch node, a second lead coupled to a reference voltage, and a control input;
   a PFC controller comprising:
      a charge-mode start controller defining a sense input coupled to a signal indicative of a voltage at the switch node, and a start output, the charge-mode start controller configured to assert the start output in a predetermined valley of the voltage at the switch node;
      a voltage-mode controller defining a feedback input coupled to the voltage output, and an initial-reset output, the voltage-mode controller configured to assert the initial-reset output by implementing voltage-mode control;
      a driver defining a drive output coupled to the control input of the electrically-controlled switch, a start input coupled to the start output, and a reset input, the driver configured to assert the control input responsive to assertion of the start input, and to de-assert the control input responsive to assertion of the reset input; and
      a reset-delay controller defining a sense input, an initial-reset input coupled to the initial-reset output, and a final-reset output coupled to the reset input of the driver, the reset-delay controller configured to:
         sense a signal indicative of magnitude of an input voltage of the PFC converter, and
         assert the final-reset output an adjusted time after assertion of the initial-reset input, the adjusted time inversely proportional to the signal indicative of magnitude of the input voltage,
      wherein when the reset-delay controller asserts the final-reset output, the reset-delay controller is configured to:

sample the signal indicative of magnitude of the input voltage and create a digital voltage value;

divide a proportionality value by the digital voltage value, and thereby create a reference value;

responsive to assertion of the initial-reset input, begin incrementing a counter creating a count value; and assert the final-reset output when the count value reaches the reference value.

13. The PFC converter of claim 12 wherein when the reset-delay controller senses the signal indicative of magnitude of the input voltage, the reset-delay controller is further configured to sense the input voltage directly at a sense terminal coupled to the voltage input.

14. The PFC converter of claim 12 wherein when the reset-delay controller senses the signal indicative of magnitude of the input voltage, the reset-delay controller is further configured to average a signal indicative of the voltage at the switch node of the PFC converter applied to a sense terminal.

15. The PFC converter of claim 12 further comprising:

a transformer in which the inductor is a primary winding of the transformer, and the transformer defines an auxiliary winding;

wherein when the reset-delay controller senses the signal indicative of magnitude of the input voltage, the reset-delay controller is further configured to sense a voltage of the auxiliary winding.

16. The PFC converter of claim 12 wherein when the reset-delay controller asserts the final-reset output, the reset-delay controller is configured to, responsive to assertion of the initial-reset input:

charge a capacitor with a charging current having a magnitude proportional to the signal indicative of magnitude of the input voltage; and assert the final-reset output when a voltage on the capacitor meets or exceeds a voltage reference.

17. The PFC converter of claim 12 wherein a total harmonic distortion of an input current of the PFC converter is 5% or less.

* * * * *